United States Patent [19]
Tam et al.

[11] Patent Number: 6,115,751
[45] Date of Patent: *Sep. 5, 2000

[54] TECHNIQUE FOR CAPTURING INFORMATION NEEDED TO IMPLEMENT TRANSMISSION PRIORITY ROUTING AMONG HETEROGENEOUS NODES OF A COMPUTER NETWORK

[75] Inventors: Ulrica Tam, Belmont; Steven H. Berl, Piedmont, both of Calif.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,837

[22] Filed: Apr. 10, 1997

[51] Int. Cl.⁷ .................................................. G06F 15/173
[52] U.S. Cl. ........................... 709/240; 709/239; 709/224
[58] Field of Search ........................... 395/200.7, 200.54, 395/200.62, 200.55, 200.56; 709/240, 224, 232, 225, 226, 239

[56] References Cited

U.S. PATENT DOCUMENTS

| | | | |
|---|---|---|---|
| 4,484,326 | 11/1984 | Turner | 370/253 |
| 4,775,973 | 10/1988 | Tomberliln et al. | 370/253 |
| 4,922,486 | 5/1990 | Lidinsky et al. | 370/60 |
| 5,210,750 | 5/1993 | Nassehi et al. | 370/85.2 |
| 5,218,676 | 6/1993 | Ben-Ayed et al. | 395/200.7 |
| 5,251,209 | 10/1993 | Jurkevich et al. | 370/468 |
| 5,261,060 | 11/1993 | Free | 395/200 |
| 5,274,631 | 12/1993 | Bhardwaj | 370/60 |
| 5,416,769 | 5/1995 | Karol | 370/60 |
| 5,440,744 | 8/1995 | Jacobson et al. | 395/650 |
| 5,446,888 | 8/1995 | Pyne | 395/600 |
| 5,473,608 | 12/1995 | Gagne et al. | 370/85.13 |
| 5,517,620 | 5/1996 | Hashimoto et al. | 395/200.72 |
| 5,546,549 | 8/1996 | Barrett et al. | 395/309 |
| 5,561,669 | 10/1996 | Lenney et al. | 370/60.1 |
| 5,634,006 | 5/1997 | Baugher et al. | 395/200.06 |
| 5,664,105 | 9/1997 | Keisling et al. | 395/200.54 |
| 5,719,942 | 2/1998 | Aldred et al. | 380/49 |
| 5,737,526 | 4/1998 | Periasamy et al. | 395/200.71 |
| 5,748,925 | 5/1998 | Waclawsky et al. | 710/131 |
| 5,787,237 | 7/1998 | Reilly | 395/112 |
| 5,848,233 | 12/1998 | Radia et al. | 395/187.01 |

OTHER PUBLICATIONS

Designing APPN Internetworks, http://www.cisco.com/univercd/cc/td/doc/cisintwk/idg4/nd2006.htm, Copyright 1989 to 1998, pp. 1 to 39.

IBM Systems Network Architecture Formats, GA27-3136-16, Copyright IBM Corp. 1977, 1996, pp. 1–1 to B24.

Systems Network Architecture IBM APPN Architecture Reference, SC30-3422-04, Copyright International Business Machines Corporation, 1986–1996, pp. 1–1 to X43.

Network Working Group Request for Comments:1795; Internetwork Technology Institute; A. Bartky, Editor; Sync Research, Inc.; Apr., 1995; pp. 1–91.

Nilausen, Jesper—APPN Networks; John Wiley & Sons, Ltd. 1994; APPN Basics, 2:11–83.

*Primary Examiner*—Zarni Maung
*Attorney, Agent, or Firm*—Cesari & McKenna

[57] ABSTRACT

A technique efficiently captures information required to create a filter used by switching nodes of a heterogeneous network to implement transmission priority routing of data traffic over a connection network between end nodes of the network. A bounded time interval, i.e., a time window, is established during which a first switching node monitors the traffic over the network to capture portions of the required information contained in a defined data packet. Monitoring of data traffic during the time window is triggered by a predictable event, the occurrence of which is communicated to the first switching node by a hybrid node of the network. In addition to providing this "triggering" communication, the hybrid node also provides the first switching node with the remaining portion of the required information.

23 Claims, 7 Drawing Sheets

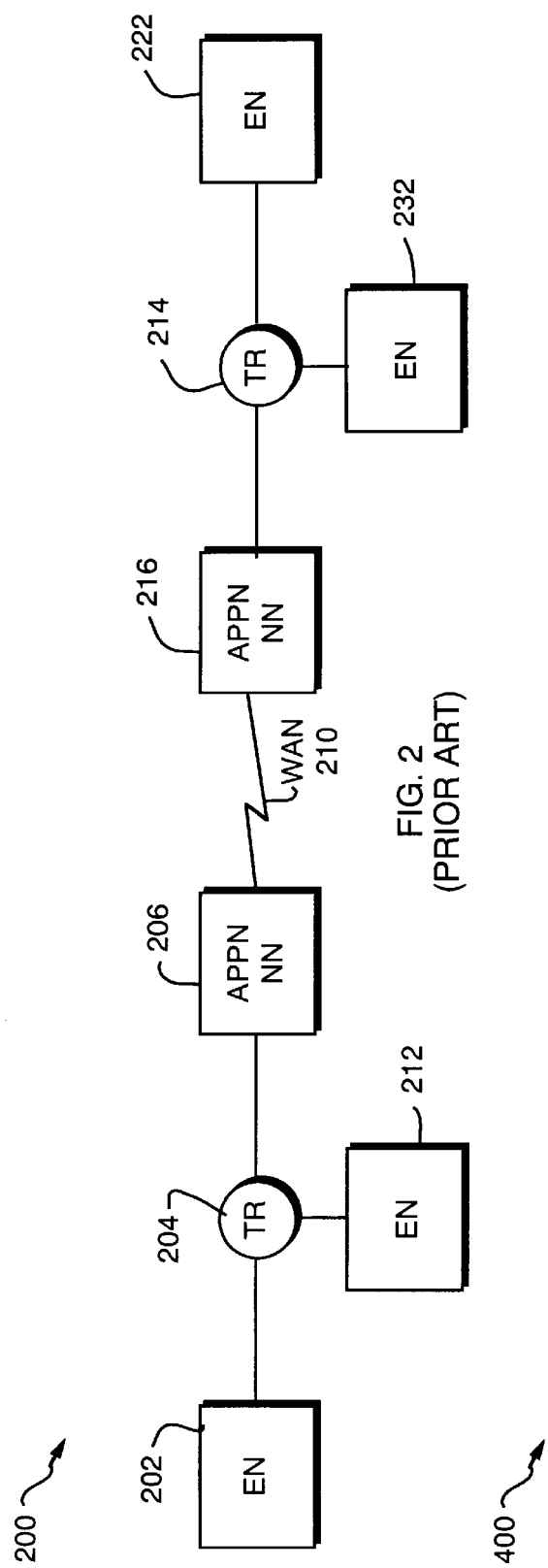
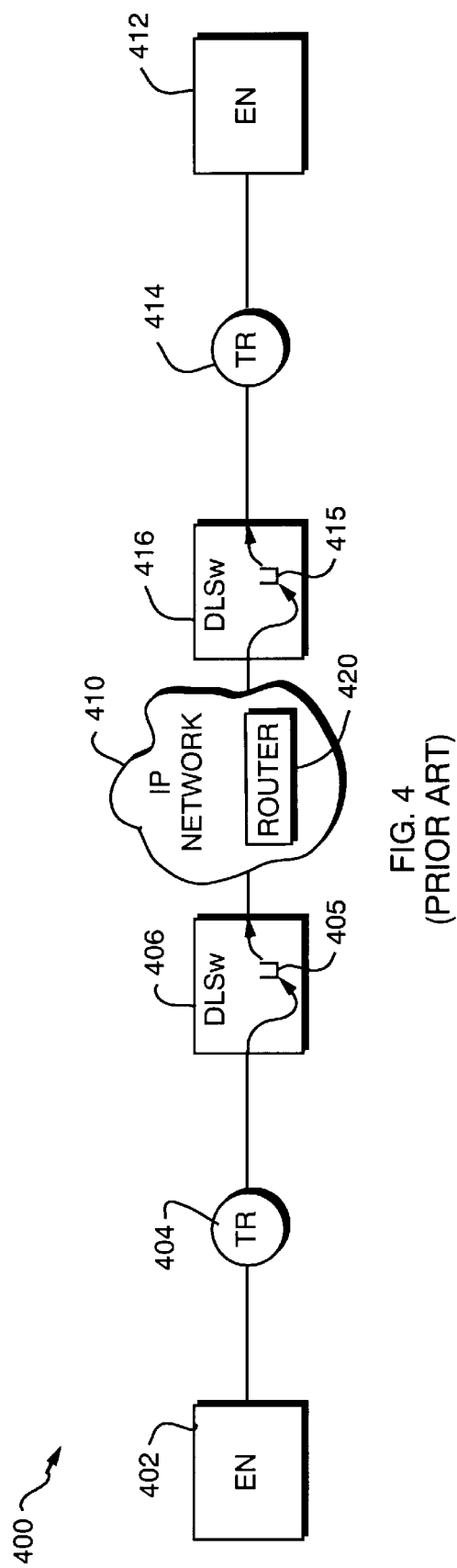
FIG. 2 (PRIOR ART)
FIG. 4 (PRIOR ART)

TECHNIQUE FOR CAPTURING INFORMATION NEEDED TO IMPLEMENT TRANSMISSION PRIORITY ROUTING AMONG HETEROGENEOUS NODES OF A COMPUTER NETWORK

CROSS-REFERENCE TO RELATED APPLICATIONS

This invention is related to the following U.S. patent applications:

U.S. patent application Ser. No. 08/839,435, titled TECHNIQUE FOR MAINTAINING PRIORITIZATION OF DATA TRANSFERRED AMONG HETEROGENEOUS NODES OF A COMPUTER NETWORK, now U.S. Pat. No. 5,991,302; and U.S. patent application Ser. No. 08/833,834, titled MECHANISM FOR CONVEYING DATA PRIORITIZATION INFORMATION AMONG HETEROGENEOUS NODES OF A COMPUTER NETWORK, now U.S. Pat. No. 5,940,390, each of which was filed on even date herewith and assigned to the assignee of the present invention; and U.S. patent application Ser. No. 09/354,360, titled MECHANISM FOR CONVEYING DATA PRIORITIZATION INFORMATION AMONG HETEROGENEOUS NODES OF A COMPUTER NETWORK, filed on Jul. 14, 1999 and assigned to the assignee of the present invention.

FIELD OF THE INVENTION

The invention relates to computer networks and, more particularly, to the efficient acquisition of predetermined information by nodes of a computer network.

BACKGROUND OF THE INVENTION

Data communication in a computer network involves the exchange of data between two or more entities interconnected by communication links and subnetworks. These entities are typically software programs executing on hardware computer platforms, such as end stations and intermediate stations. Examples of an intermediate station may be a router or switch which interconnects the communication links and subnetworks to enable transmission of data between the end stations. A local area network (LAN) is an example of a subnetwork that provides relatively short distance communication among the interconnected stations; in contrast, a wide area network (WAN) enables long distance communication over links provided by public or private telecommunications facilities.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. Examples of such communications architectures include the Systems Network Architecture (SNA) developed by International Business Machines Corporation and the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 of the Internet architecture accepts industry standards defining a flexible network architecture oriented to the implementation of LANs.

Specifically, the network interface layer 120 comprises physical and data link sublayers. The physical layer 126 is concerned with the actual transmission of signals across the communication channel and defines the types of cabling, plugs and connectors used in connection with the channel. The data link layer, on the other hand, is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network and provides for environments that need connectionless or connection-oriented services at the data link layer.

Connection-oriented services at the data link layer generally involve three distinct phases: connection establishment, data transfer and connection termination. During connection establishment, a single path is established between the source and destination stations. This connection, e.g., an IEEE 802.2 LLC Type 2 or "Data Link Control" (DLC) connection as referred hereinafter, is based on the use of service access points (SAPs); a SAP is generally the address of a port or access point to a higher-level layer of a station. Once the connection has been established, data is transferred sequentially over the path and, when the DLC connection is no longer needed, the path is terminated. The details of such connection establishment and termination are well-known and, thus, will not be described herein.

The transport layer 114 and the internetwork layer 116 are substantially involved in providing predefined sets of services to aid in connecting the source station to the destination station when establishing application-to-application communication sessions. The primary network layer protocol of the Internet architecture is the Internet protocol (IP) contained within the internetwork layer 116. IP is primarily a connectionless network protocol that provides internetwork routing, fragmentation and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. The term TCP/IP is commonly used to refer to the Internet architecture.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process.

SNA is a mainframe-oriented network architecture that also uses a layered approach. The services included within this architecture are generally similar to those defined in the Internet communications architecture. In a SNA network, though, applications executing on end stations typically access the network through logical units (LU) of the stations; accordingly, in a typical SNA network, a communication session connects two LUs in a LU-LU session. Activation and deactivation of such a session is addressed by Advanced Peer to Peer Networking (APPN) functions.

The APPN functions generally include session establishment and session routing within an APPN network. FIG. 2 is a schematic block diagram of a prior art APPN network 200 comprising end stations 202, 212 and 222, 232, which are typically configured as end nodes (EN), coupled to token ring (TR) subnetworks 204 and 214, respectively. Intermediate stations 206 and 216, configured as APPN network nodes (NN), are interconnected by a WAN 210 that extends the SNA/APPN architecture throughout the network. An APPN network node is a full-functioning APPN router node having all APPN base service capabilities, including directory services functions. An APPN end node, on the other hand, is capable of performing only a subset of the functions provided by an APPN network node.

During session establishment, a SNA device (such as EN 202) requests an optimum route for a session between two LUs; this route is calculated and conveyed to EN 202 by an intermediate station functioning as a network node server (e.g., station 206) via a LOCATE message exchange through the network 200. Thereafter, a "set-up" or BIND message is forwarded over the route to initiate the session. The BIND includes information pertaining to the partner LU requested for the session. Intermediate session routing occurs when APPN network nodes are present in a session between the two devices and forward packets of an LU-LU session over the calculated route between those devices. However, when the session is between devices (such as EN 202, 212) coupled to a shared medium (such as TR 204), network nodes (such as APPN NN 206, 216) are not present in the session and session routing is not necessary.

In such a connection network arrangement, a connection to a virtual routing node is defined in each of the nodes coupled to this portion of the network. The BIND message is again used to convey the calculated route to those nodes coupled to the network. Thereafter, packets are forwarded over the established LU-LU session along the calculated route directly between the two APPN end nodes. APPN nodes and connection networks are well-known and are, for example, described in detail in *Systems Network Architecture Advanced Peer to Peer Networking Architecture Reference* IBM Doc SC30-3422 and *APPN Networks* by Jesper Nilausen, printed by John Wiley and Sons, 1994, at pgs 11–83.

FIG. 3 is a schematic block diagram of the software architecture of a prior art APPN node 300. As noted, application 302 executing on an APPN end node, such as EN 202 of network 200, communicates with another end node, such as EN 212, through a LU-LU session; LU 304 within each end node functions as both a logical port for the application to the network and as an end point of the communication session. The session generally passes through a path control module 312 and a data link control (DLC) module 316 of the node, the latter of which connects to various network transmission media.

An intermediate session routing (ISR) module 305 maintains a portion of the session in each "direction" with respect to an adjacent node. In response to receiving the BIND message during session establishment, path control 312 and ISR 305 are invoked to allocate resources for the session. In particular, each node allocates a local form session identifier (LFSID) for each direction of the session; the LFSID is thereafter appended to the packets by the node in a transmission header field of a SNA header to identify the session context. Collectively, each of these individually-established "local" sessions form the logical communication session between the LUs 304 of the end nodes 202, 212.

When initiating a session, the application 302 specifies a mode name that is carried within the BIND message and distributed to all APPN nodes; the LU 304 in each node uses the mode name to indicate the set of required characteristics for the session being established. Specifically, the mode name is used by control point (CP) module 308 of each APPN node 300 to find a corresponding class of service (COS) as defined in a COS table 310. The CP coordinates performance of all APPN functions within the node, including management of the COS table 310. The COS definition in table 310 includes a priority level specified by transmission priority (TP) information 320 for the packets transferred over the session; as a result, each APPN node is apprised of the priority associated with the packets of a LU-LU session. The SNA architecture specifies four (4) TP levels: network priority, high priority, medium priority and low priority. Path control 312 maintains a plurality of queues 314, one for each TP level, for transmitting packets onto the transmission media via DLC 316.

Data link switching (DLSw) is a forwarding mechanism for the SNA architecture over an IP backbone network, such as the Internet. A DLSw network is formed when two DLSw switches interconnect the end nodes of the APPN network by way of the IP network; the DLSw switches preferably communicate using a switch-to-switch protocol (SSP) that provides packet "bridging" operations at the LLC (i.e., DLC) protocol layer. FIG. 4 is a schematic block diagram of a prior art DLSw network 400 comprising DLSw switches 406, 416 interconnecting ENs 402, 412 via IP network 410. The DLSw forwarding mechanism is also well-known and described in detail in Request for Comment (RFC) 1795 by Wells & Bartky, 1995 at pgs 1–91.

According to the DLSw technique, a lower-layer DLC connection is established between each EN and DLSw switch; however, these connections terminate at the switches 406, 416. In order to provide a complete end-to-end connection between the end nodes, the DLC connections are "disposed" over a reliable, higher-layer transport mechanism, such as TCP sessions. DLSw switches can establish multiple, parallel TCP sessions using well-known port numbers. All packets associated with a particular DLC connection typically follow a single, designated TCP session. Accordingly, SNA data frames originating at a sending EN 402 are transmitted over a particular DLC connection along TR 404 to DLSw switch 406, where they are encapsulated within a designated TCP session as packets and transported over IP network 410. The packets are received by DLSw switch 416, decapsulated to their original frames and transmitted over a corresponding DLC connection of TR 414 to EN 412 in the order received by switch 406 from EN 402.

Typically, all packets transmitted by DLSw switch 406 over a DLC connection/TCP session flow at the same priority level from a single output queue 405 of the switch and arrive at an output queue 415 of DLSw switch 416 in the same order in which they are transmitted. When the switches are configured as bridges to forward packets over a TCP session through the IP network, prioritization is straightforward. However, it may be desired to integrate the functions of an APPN network node within a DLSw switch by overlaying an APPN layer onto a DLSw layer of the switch; the resulting hybrid node may prioritize the packets at the APPN layer in an order governed by the TP information levels.

A problem that arises when deploying a hybrid node in such a heterogeneous network is that the TP priority information is lost when passing the packets between the APPN and DLSw layers, primarily because the TP information is not encapsulated within the packets. That is, the APPN layer has knowledge of the TP levels associated with the packets of a LU-LU session as a result of its involvement during session establishment; yet that information is not encapsulated within the associated packets and, thus, is not typically conveyed beyond the APPN layer. An example of a tagging mechanism suitable for use with the present invention that conveys TP levels from the APPN layer to the DLSw layer is disclosed in copending and commonly-assigned U.S. patent application, titled *Technique for Maintaining Prioritization of Data Transferred Among Heterogeneous Nodes of a Computer Network*, filed herewith and incorporated by reference as though fully set forth herein.

As described in that commonly-assigned application, the APPN protocol layer of the hybrid node assigns a TP level to each packet and passes that priority information to the DLSw layer of the node via an application programming interface extension. The TP level is converted to information that is "tagged" to each packet and the DLSw layer allocates each tagged packet to a TCP session based on the assigned TP level. The tagged information is then encapsulated within an IP header to enable intermediate routers to maintain the order and priority of the packet as it is transmitted outbound over the IP network to a receiving DLSw switch.

The tagged information within the IP header is not discernible to the receiving DLSw switch and, thus, the switch has no knowledge of the TP level associated with the outbound packet. When responding to the outbound packet, the DLSw switch cannot select (on the basis of priority) the proper TCP session over which to transmit a corresponding inbound packet; accordingly, the switch arbitrarily chooses a session. If the chosen TCP session has a lower designated priority than the session carrying the outbound packet, network throughput may be negatively impacted.

A solution to this problem is disclosed in copending and commonly-assigned U.S. patent application, titled *Mechanism for Conveying Data Prioritization Information Among Heterogeneous Nodes of a Computer Network*, filed herewith and incorporated by reference as though fully set forth herein. Here, a packet-recognizing filter is generated by the hybrid node and dynamically transmitted to the DLSw switch over a predefined communication channel of the network. The filter contains information, including a LFSID classifying the LU-LU session context of the specific packet, that enables the switch to assign appropriate TP levels to the inbound packets.

The hybrid node functions as an APPN router node in this latter commonly-assigned application and, as a result, it allocates the LFSID. However, since a connection network arrangement enables a LU-LU session between end nodes without the need for such a router node, the LFSID is assigned by the end node originating the LU-LU session. Although the hybrid node is used to calculate the optimum route between the end nodes, it has no knowledge of the LFSID and thus cannot provide it to the DLSw switch. The present invention is directed to solving the problem of providing such information to a switching node of a heterogeneous network.

SUMMARY OF THE INVENTION

The invention comprises a technique for efficiently capturing information required to create a filter used by switching nodes of a heterogeneous network to implement transmission priority (TP) routing of data traffic over a connection network between end nodes of the network. In accordance with the inventive technique, a bounded time interval, i.e., a time window, is established during which a first switching node monitors the traffic over the network to capture portions of the required information contained in a defined data packet. Monitoring of data traffic during the time window is triggered by a predictable event, the occurrence of which is communicated to the first switching node by a hybrid node of the network. In addition to providing this "triggering" communication, the hybrid node also provides the first switching node with the remaining portion of the required information.

In the illustrative embodiment, the heterogeneous network is preferably a data link switching (DLSw) network and the switching nodes are DLSw switches, whereas the hybrid node is an advanced peer-to-peer networking (APPN) node with DLSw capabilities. The defined data packet is a BIND message used to convey an optimum route for a logical unit to logical unit (LU-LU) session between applications executing on the end nodes of the DLSw network.

Information needed to create the filter includes a local form session identifier (LFSID) and a TP level. The BIND message contains both a mode name that is used to reference the TP level and the address of the logical unit originating the BIND exchange. Because TP routing occurs over the connection network, the address of the originating logical unit (OLU) is needed by the first DLSw node to acquire the LFSID. The predictable event is preferably a LOCATE data flow between the OLU and the hybrid node.

Operationally, the OLU issues a LOCATE request to the hybrid node, requesting the latter node to locate a destination logical unit of an end node by invoking directory services. If the data session path traverses the DLSw connection network environment, the hybrid node issues a "sniffing" filter to the first DLSw node prior to responding to the LOCATE request. Preferably, the sniffing filter instructs the first DLSw node to monitor data traffic over the network for the BIND message and, to that end, contains addressing information relating to the orginating and destination end nodes, along with the TP level associated with a particular mode name.

Upon receiving the filter, the first DLSw node commences examination of the data traffic and, in response to recognizing the BIND message, captures the contents of its mode name and its LFSID (contained in the SNA transmission header). The node then compares these captured contents with the contents of the sniffing filter (e.g., the addressing information and mode name) and if they match, the LFSID is recorded. All subsequent inbound packets having a LFSID that matches the captured LFSID are transmitted at the specified TP level.

An advantage of the inventive technique is a reduction in overhead of the switching node, which overhead would otherwise be consumed by constantly monitoring network traffic for the defined data packet. To that end, the time window should be relatively short to ensure that no excessive overhead is generated.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 2 is a schematic block diagram of a prior art Advanced Peer to Peer Networking (APPN) network including APPN nodes;

FIG. 4 is a schematic block diagram of a prior art data link switching (DLSw) network;

DETAILED DESCRIPTION OF ILLUSTRATIVE EMBODIMENT

Figure 5:
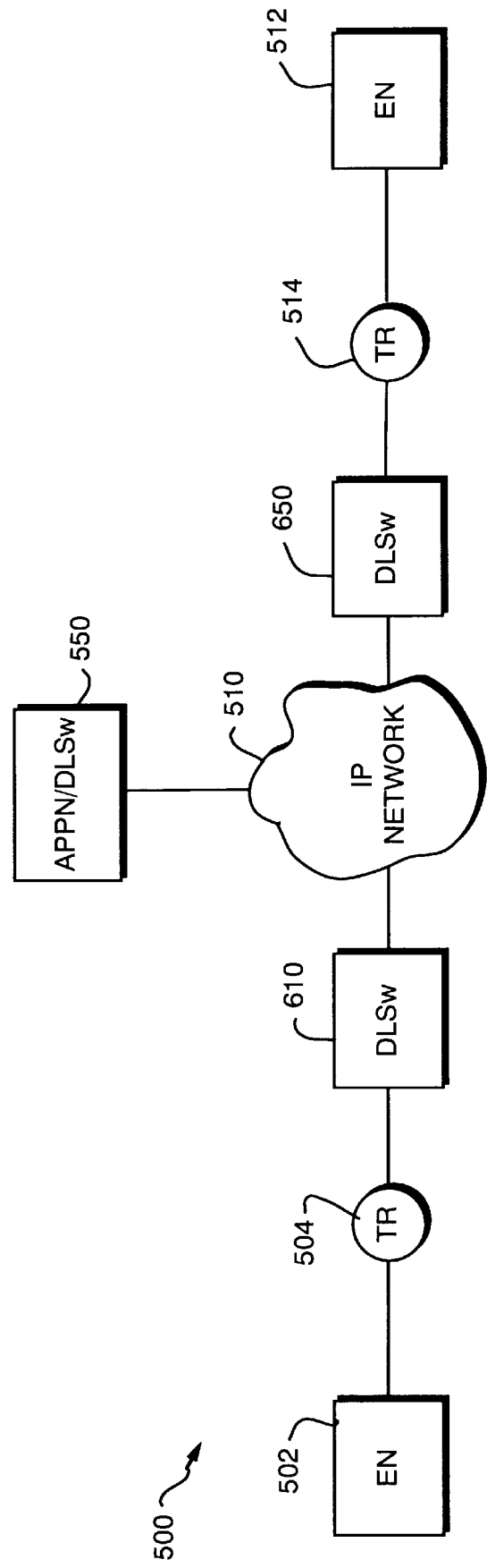
FIG. 5 is a block diagram of a heterogeneous computer network, including a DLSw node and an APPN/DLSw hybrid node for interconnecting various subnetworks and communication links on which the present invention may advantageously operate.

FIG. 5 is a block diagram of a computer network 500 comprising a collection of interconnected communication links and subnetworks attached to a plurality of stations. The stations are typically computers comprising end stations 502, 512 and intermediate stations 550, 610, 650. Preferably, the end stations are Advanced Peer to Peer Networking (APPN) end nodes, although the stations may comprise other types of nodes such as Low Entry Networking nodes or Physical Units 2.0 via Dependent Logical Unit Requestor functions. In addition, the intermediate stations 610, 650 are data link switching (DLSw) nodes and intermediate station 550 is an APPN/DLSw hybrid node.

Each node typically comprises a plurality of interconnected elements, such as a processor, a memory and a network adapter. The memory may comprise storage locations addressable by the processor and adapter for storing software programs and data structures associated with the inventive information capturing techniques. The processor may comprise processing elements or logic for executing the software programs and manipulating the data structures. An operating system, portions of which are typically resident in memory and executed by the processor, functionally organizes the node by, inter alia, invoking network operations in support of software processes executing on the node. It will be apparent to those skilled in the art that other memory means, including various computer readable media, may be used for storing executable program instructions pertaining to the techniques described herein.

The subnetworks included within network 500 are preferably local area networks (LANs) and the communication links may include wide area network (WAN) links; in the illustrative embodiment of the invention, the LANs are preferably token rings (TR) 504, 514 and an IP network 510, which may comprise either a LAN and/or a WAN configuration such as X.25, inteconnects the nodes 550, 610, 650. Communication among the nodes coupled to the network 500 is typically effected by exchanging discrete data packets or frames via connection-oriented service sessions between the communicating nodes.

Figure 3:
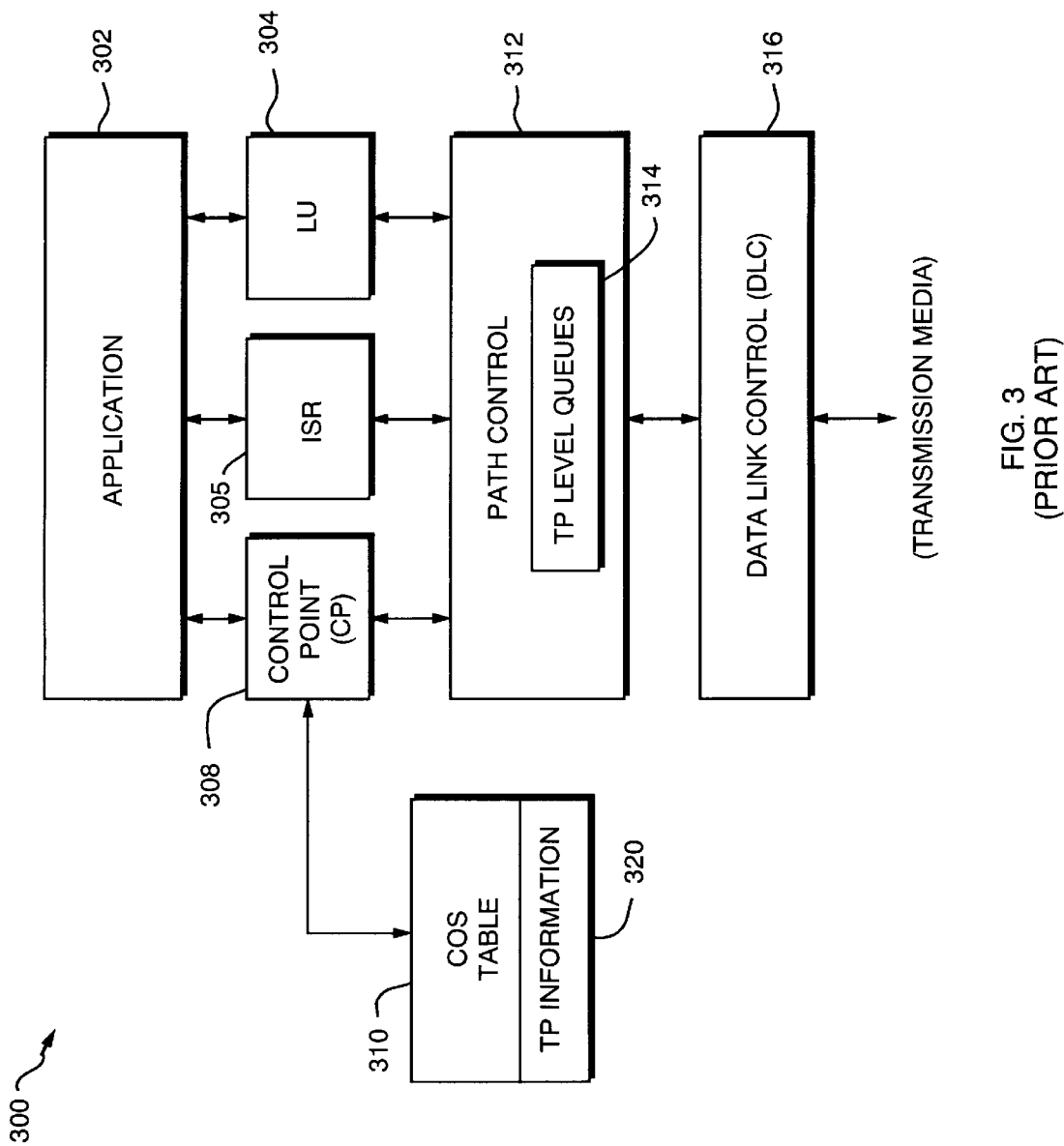
FIG. 3 is a schematic block diagram of the software architecture a prior art APPN node.
Figure 6:
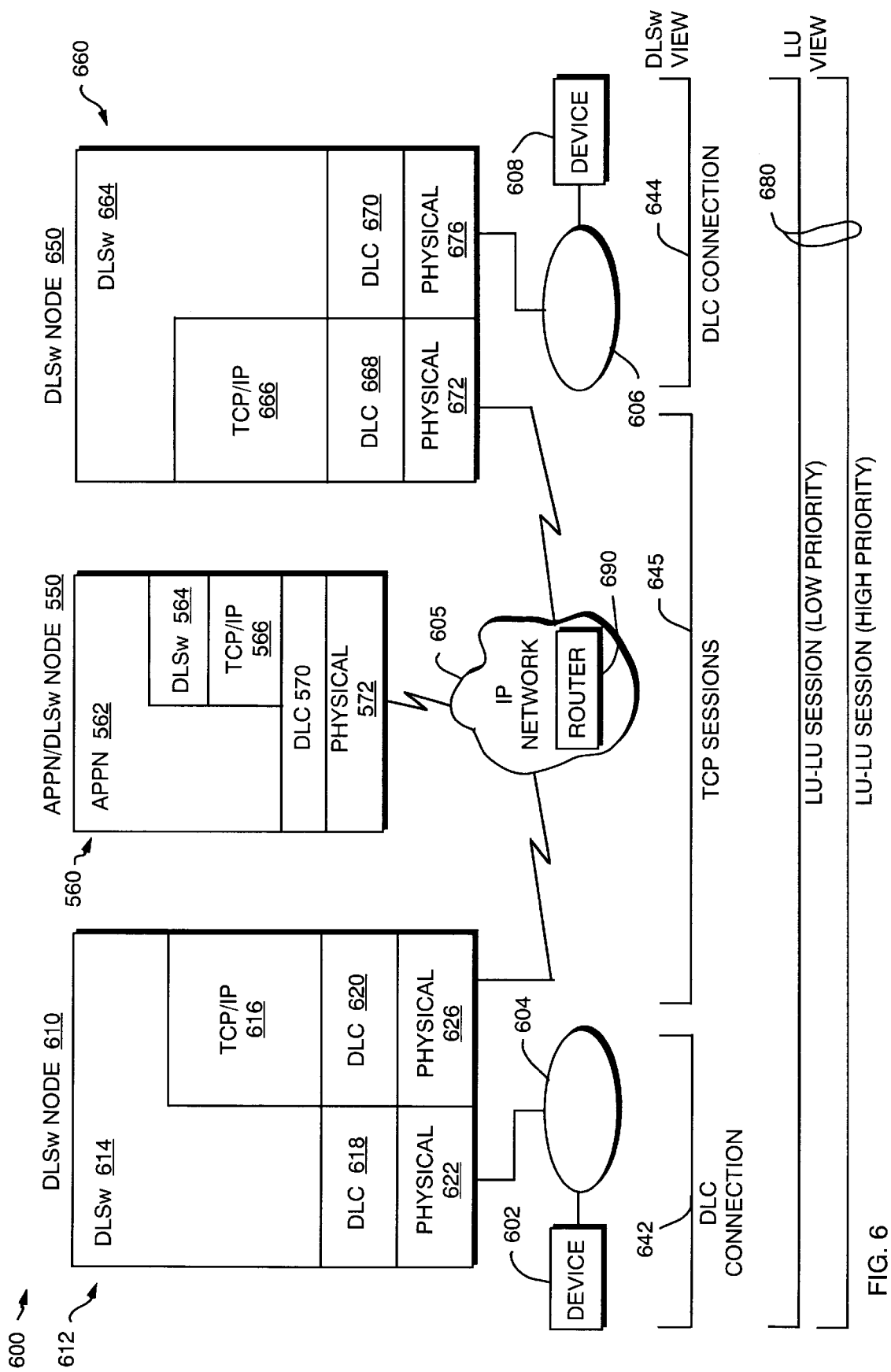
FIG. 6 is a schematic block diagram of protocol stacks contained within the DLSw and APPN/DLSw nodes of FIG. 5.

A heterogeneous network is formed when APPN/DLSw hybrid node 550 is connected to DLSw nodes 610, 650 via an IP network. FIG. 6 is a schematic block diagram of protocol stacks 560, 612, 660 within the nodes 550, 610 and 650, respectively. Applications executing on SNA devices (end nodes) 602, 608 typically access the network 600 through logical units (LU) and communicate via LU-LU sessions. Hybrid node 560 functions to facilitate establishment of these connection-oriented communication sessions within the network. To this end, protocol stack 560 preferably comprises an APPN layer 562 that contains the software modules described in FIG. 3.

Figure 1:
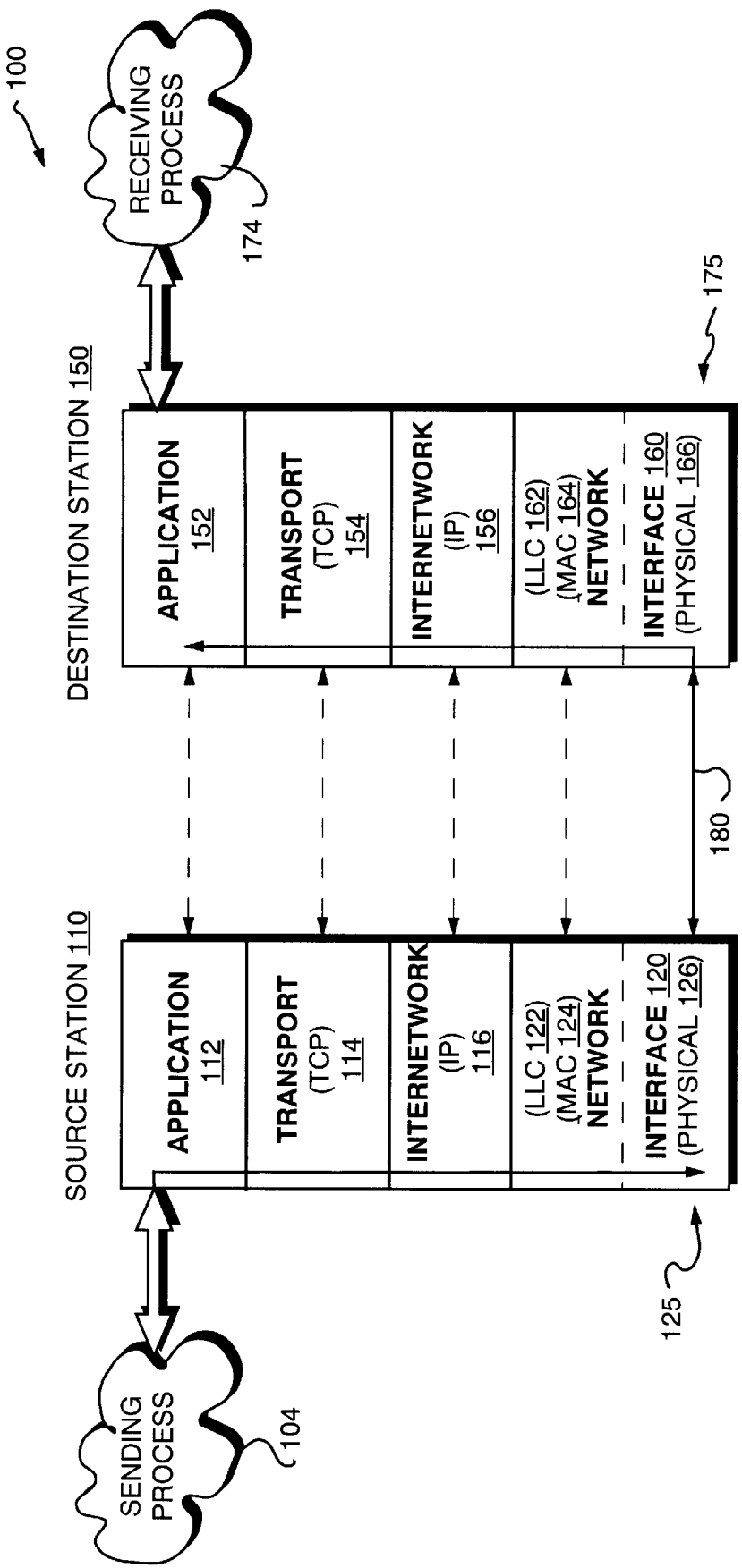
FIG. 1 is a schematic block diagram of prior art communications architecture protocol stacks, such as the Internet protocol stack, used to transmit data between stations of a computer network.

The stack 560 also includes a Transmission Control Protocol/Internet protocol (TCP/IP) layer 566 containing those layers of the Internet communications architecture protocol stack (FIG. 1) needed to establish, e.g., conventional connection-oriented, TCP communication sessions. Physical sublayer 572 specifies the electrical, mechanical, procedural and functional specifications for activating, maintaining and de-activating the physical link 605 of the network. Each protocol stack 612, 660 of DLSw nodes 610, 650 likewise includes a TCP/IP layer 616, 666 and physical sublayers 622,626 and 672, 676, which are functionally equivalent to the physical layer of protocol stack 560.

Each node further contains a DLSw layer 564, 614, 664 and data link control (DLC) (sub)layers 570, 618, 620, 668 and 670, these latter layers providing a connection-oriented service via conventional DLC connections. The DLSw layers provide a mechanism for forwarding data frame traffic between nodes over IP network 605. Preferably, the DLSw layers 564, 614, 664 cooperate in a peer-relationship and communicate via a switch-to-switch protocol (SSP) to, inter alia, define TCP sessions over the IP network.

In the illustrative embodiment, there are a plurality of connection/session "views" established within the network 600. For example, from DLSw view, there is a DLC connection 642 between device 602 and DLSw layer 614 of node 610, and a DLC connection 644 between DLSw layer 664 and device 608; in order to provide reliable, end-to-end connections between the devices, these DLC connections are "overlayed" onto TCP sessions (denoted 645) between the two DLSw layers 614, 664. In addition, from a LU view, there are multiple LU-LU sessions 680 (at various priority levels) between the LUs of devices 602 and 608.

It should be noted that the TCP sessions are initiated between DLSw peers 564, 614, 664 in accordance with a conventional TCP transport protocol. Thereafter, SSP control messages are exchanged between the DLSw layers of the nodes to establish an end-to-end DLSw circuit over the session. Information contained within these control messages are used to generate a DLSw circuit identifier that associates the DLSw circuit with the session. Preferably, the DLC connections 642, 644 overlayed on the TCP session 645 "map" to the DLSw circuit. The generation of DLSw circuits and identifiers is described in *Request for Comment* (*RFC*) 1795 by Wells & Bartky, 1995, while the establishment of multiple TCP sessions between DLSw peer layers is described in both *RFC* 1795 and *Internetworking with TCP/IP* by Comet and Stevens, printed by Prentice Hall, 1991; all of these publications are hereby incorporated by reference as though fully set forth herein.

As further noted, a connection network involves a LU-LU session directly between two devices, e.g., end nodes (EN) 602 and 608, without hybrid node 550 in the data session path. If it were to participate in session routing, the APPN/DLSw node 550 would allocate a local form session identifier (LFSID) that classifies the LU-LU session. In order to enable switching nodes (such DLSw nodes 610 and 650) to perform transmission priority (TP) routing, the node 550 would further provide the allocated LFSID within a packet-recognizing filter and send it over a predefined communication channel to the nodes. Yet the APPN/DLSw node 550 is not present in the data path of the connection network session, it has no knowledge of the LFSID and thus it cannot provide the LFSID to the DLSw nodes 610 and 650. Rather, the LFSID is allocated by the device originating the LU-LU session, e.g., EN 602.

In accordance with the present invention, a technique is provided for enabling a DLSw node to efficiently capture the information required to create a filter that may be used to implement TP routing of data traffic over a connection network between EN 602 and 608 of network 600. The required information includes the LFSID and a TP level, and the technique involves establishing a bounded time interval, i.e., a time window, during which DLSw node 610 monitors data traffic over the heterogeneous network 600 to capture portions of this required information.

Specifically, the DLSw node monitors the traffic to capture the contents of a BIND message, which contents comprise (i) a mode name used to reference the TP level and (ii) the address of the LU originating the BIND exchange. Because TP routing occurs over the connection network, the address of the originating logical unit (OLU) is needed by DLSw node 610 to acquire the LFSID. Moreover, monitoring of data traffic during the time window is triggered by the occurance of LOCATE data flows among the OLU (such as LU of EN 602) and the hybrid node 550. According to the invention, node 550 notifies DLSw node 610 of this "triggering" event, while also providing node 610 with portions of the required information.

Figure 7:
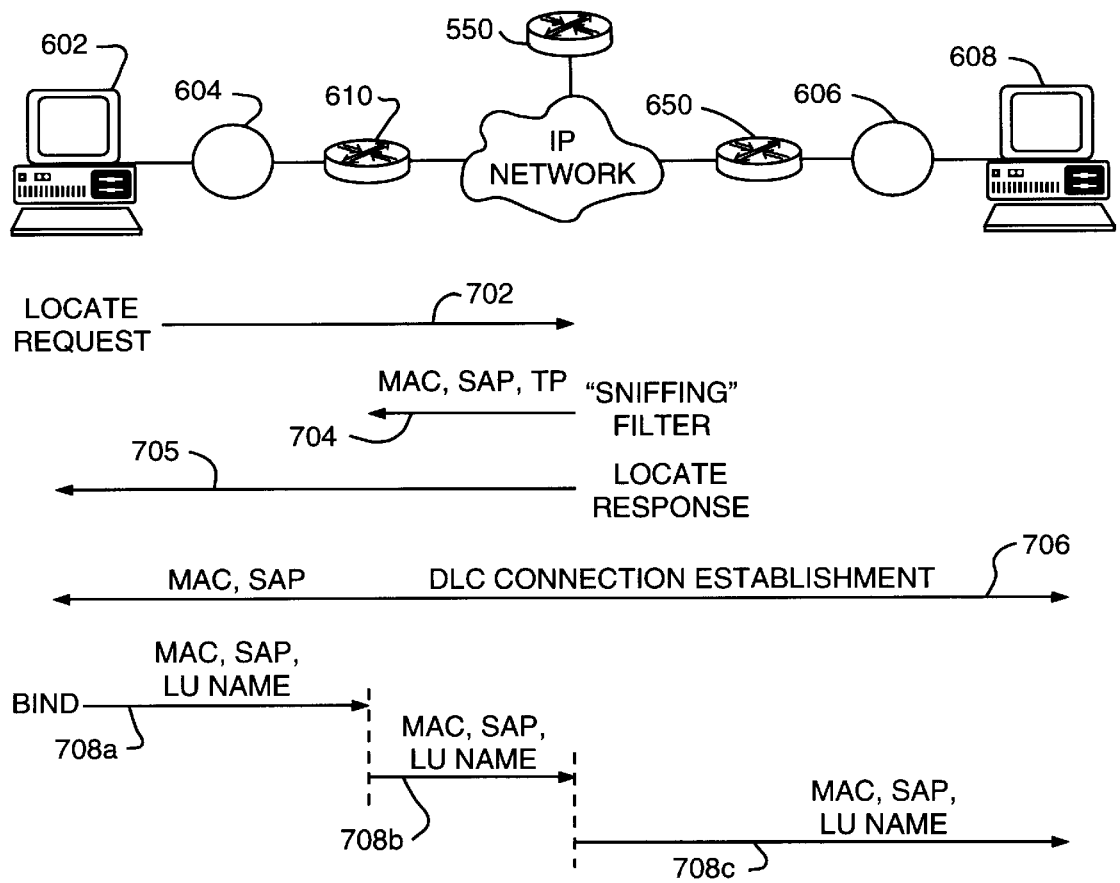
FIG. 7 is a flow diagram depicting LOCATE and BIND flows between the nodes of the heterogeneous network.

FIG. 7 is a flow diagram depicting the LOCATE and BIND flows among the nodes of network 600. Specifically, the OLU of EN 602 issues a LOCATE request to hybrid node 550 via flow 702, requesting the hybrid node to locate a destination logical unit (DLU) of, e.g., EN 608 by invoking directory services. Using information contained within the LOCATE request, the hybrid node invokes its directory services and forwards the LOCATE request onto EN 608 (not shown). EN 608 then sends a response to the LOCATE request and the hybrid node computes an optimum route to the DLU.

Figure 8:
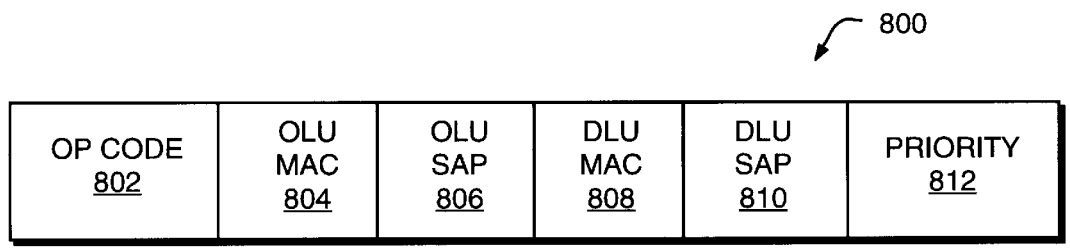
FIG. 8 is a schematic block diagram of a sniffing filter used in accordance with the invention.

The hybrid node generates and issues a "sniffing" filter to DLSw node 610 via a flow 704. FIG. 8 is a schematic block diagram of the sniffing filter 800. The sniffing filter instructs the node 610 to monitor data traffic over the network 600 for the BIND message and, to that end, contains addressing and priority information. Specifically, the filter includes a field 802 containing an opcode identifying the sniffing filter and instructing a search for BIND message flows, a media access control (MAC) address field 804 and a service access point (SAP) field 806 for storing addressing information relating to the OLU (node 602), and a MAC field 808 and a SAP field 810 containing addressing information for the DLU (node 608). In addition, the filter 800 contains a priority field 812 that stores TP level associated with a particular mode name.

Referring again to FIG. 7, the hybrid node 550 sends a LOCATE response to EN 602 (via flow 705) with the computed route appended thereto. The nodes of the network then cooperate to establish a DLC connection over flow 706. Thereafter, the OLU of EN 602 issues a BIND message exchange to the DLU of EN 608 over flow 708 to initiate the LU-LU session. Specifically, flow 708 encompasses discrete BIND flows between (i) EN 602 and DLSw node 610 via flow 708*a*, (ii) DLSw node 610 and DLSw node 650 via a TCP/BIND flow 708*b*; and (iii) DLSw node 650 to EN 608 via flow 708*c*.

Figure 9:
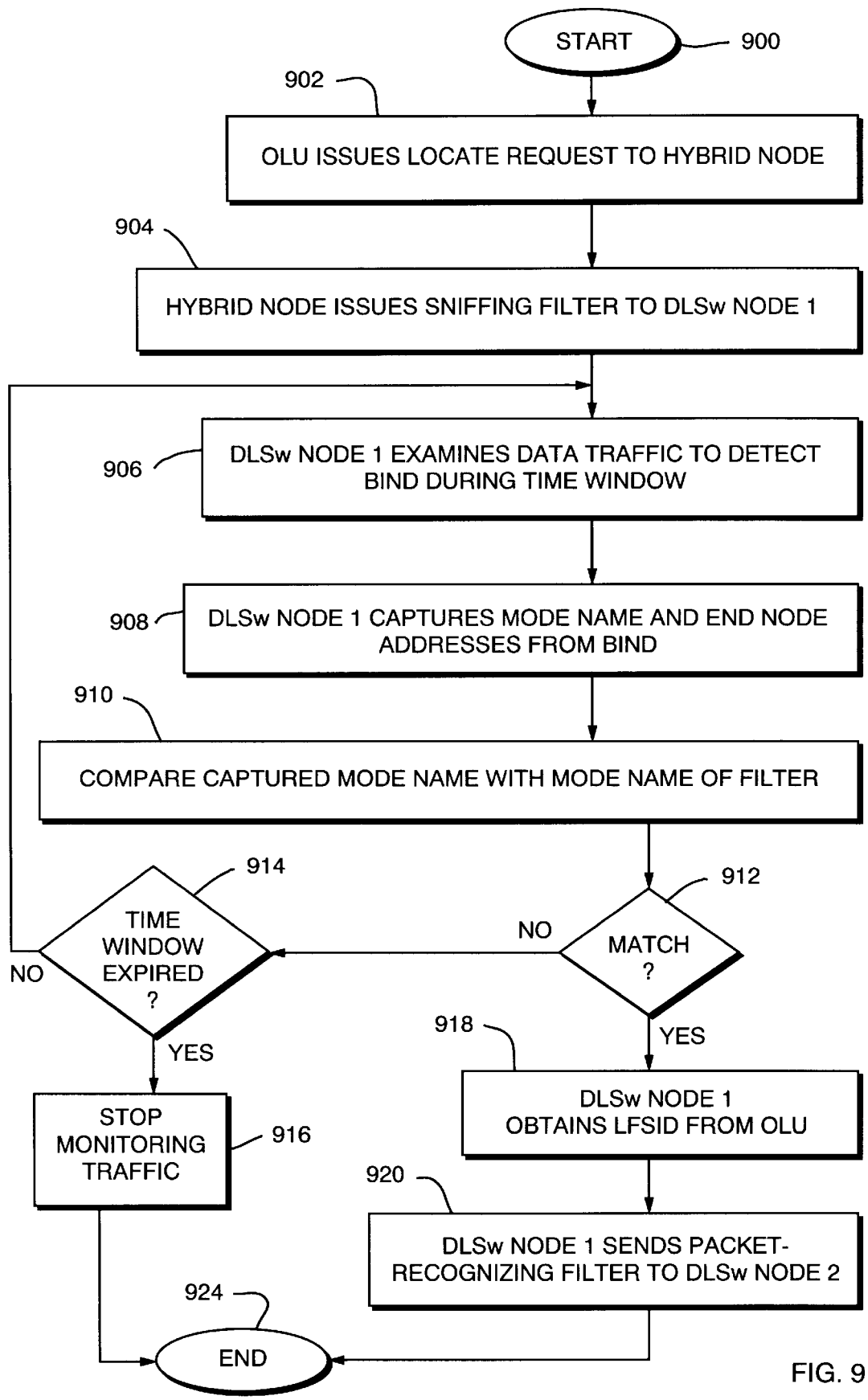
FIG. 9 is a flowchart illustrating an inventive technique for capturing information required to implement transmission priority routing of data traffic over a connection network.

FIG. 9 is a flowchart illustrating a process of the inventive technique for capturing information required to implement transmission priority routing of data traffic over a connection network. The process starts in Step 900 and proceeds to Step 902 where the OLU issues a LOCATE request to the hybrid node requesting computation of a route to the DLU. The hybrid node responds to the request by issuing a "sniffing" filter to DLSw node 610 in Step 904 and by sending a LOCATE response to the DLU. Upon receiving the filter, DLSw node 610 commences examination of the data traffic to detect a BIND message in Step 906. As noted, examination of the data traffic over the network occurs during a specified time window. In general, this window may be specified by a user based on the traffic load and network latency; in the illustrative embodiment described herein, the bounded time interval for the window is preferably 10 seconds.

In Step 908, the node 610 recognizes the BIND message flow and captures the contents of its mode name and its end node address fields. The node then compares the captured mode name with the particular mode name contained in the sniffing filter (Step 910). If the mode names do not match (No branch of Step 912) and if the time window has not expired (No branch of Step 914), the process returns to Step 906 and the node continues to monitor the traffic for the remainder of the time window interval. On the other hand, if the time window has expired (Yes branch of Step 914), the node stops monitoring data traffic in Step 916 and the process ends in Step 924.

Otherwise, if there is a match in Step 912, the node 610 records the LFSID (from the SNA transmission header) for the LU-LU session (Step 918). In response to acquiring the LFSID, node 610 generates a packet-recognizing filter; as noted above, the packet-recognizing filter conveys information pertaining to the TP level of inbound packets associated with the LU-LU session. The node 610 transfers the packet-recognizing filter over IP network 605 to DLSw node 650 in Step 920. The DLSw node 650 uses the information to perform TP routing of data traffic over the connection network. The process then ends in Step 924.

An advantage of the inventive technique described herein is a reduction in overhead of the switching node when monitoring network traffic. In particular, the DSLw node should commence monitoring of data traffic immediately before the OLU issues the BIND message to minimize overhead. By "sniffing" only when there is a high probability of quickly detecting the BIND message, the switching node reduces what would otherwise be the consumption of vast amounts of overhead constantly monitoring network traffic for the defined data packet. The user-specified time window should be relatively short to ensure that no excessive overhead is generated.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently acquiring information used by first and second switching nodes of a heterogeneous network to implement transmission priority (TP) routing of data traffic over a connection network between end nodes of the network, the method comprising the steps of:
    establishing a bounded time interval during which a first switching node examines the data traffic over the network;
    triggering monitoring the data traffic during the bounded time interval for a defined data packet in response to a predetermined triggering event; and
    capturing a portion of the information from the defined data packet at the first switching node during the bounded time interval, the captured portion of information used to implement TP routing;
    wherein the predetermined triggering event is a request issued by one node of the network to a second node of the network for the second node to compute a route through the network between the one node and a third node of the network.

2. The method of claim 1 further comprising the step of communicating occurrence of the predetermined event from a hybrid node of the network to the first switching node.

3. The method of claim 2 wherein the defined data packet is a BIND message used to convey an optimum route for a logical unit to logical unit (LU-LU) session between the end nodes and wherein the step of communicating comprises the steps of:
    generating a sniffing filter at the hybrid node, the sniffing filter specifying an opcode instructing a search for the BIND message and a mode name associated with a particular TP level; and
    transferring the sniffing filter to the first switching node.

4. The method of claim 3 further comprising the step of providing the remaining portion of the information from the hybrid node to the first switching node using the sniffing filter.

5. The method of claim 4 wherein the predetermined event is a LOCATE data flow, and wherein a first of the end nodes is an originating logical unit (OLU) and a second of the end nodes is a destination logical unit (DLU).

6. The method of claim 5 further comprising the step of issuing a LOCATE request from the OLU to the hybrid node, the request instructing the hybrid node to locate the DLU.

7. The method of claim 6 further comprising the steps of, in response to the step of issuing:
    invoking directory services at the hybrid node; and
    computing the optimum route.

8. The method of claim 7 wherein the portion of the information captured by the first switching node comprises a mode name and an address of the OLU.

9. The method of claim 8 further comprising the steps of:
    comparing the captured mode name with the particular mode name specified in the sniffing filter; and,
    identifying the address of the OLU issuing the BIND message.

10. The method of claim 9 further comprising the steps of:
    in response to the mode names matching in the step of comparing, recording a local form session identifier (LFSID) for the LU-LU session, the LFSID being contained in a header of the BIND message;
    generating a packet-recognizing filter at the first DLSw node, the packet-recognizing filter conveying information pertaining to the TP level of inbound packets associated with the LU-LU session; and
    transferring the packet-recognizing filter over the network to a second switching node to enable TP routing of data traffic over the connection network.

11. Apparatus for capturing information required to implement transmission priority (TP) routing of data traffic over a network coupling network devices, the apparatus comprising:
    a switching node coupled to the network, the switching node monitoring the data traffic during a time window to capture a portion of the required information contained in a defined data packet; and
    a hybrid node coupled to the network and configured to communicate occurrence of a predictable triggering event to the switching node, the occurrence of the predictable event triggering monitoring of the data traffic by the switching node, the predictable event being a request issued by one node of the network to determine a route between the one node and a second node of the network.

12. The apparatus of claim 11 further comprising a sniffing filter generated by the hybrid node and provided to the switching node to convey a remaining portion of the information required to implement TP routing.

13. The apparatus of claim 12 wherein the defined data packet is a BIND message used to convey an optimum route for a logical unit to logical unit (LU-LU) session between the devices.

14. The apparatus of claim 13 wherein the predictable event is a LOCATE data flow, and wherein a first of the devices is an originating logical unit (OLU) and a second of the devices is a destination logical unit (DLU).

15. The apparatus of claim 14 wherein the portion of the information captured by the switching node comprises a mode name and an address of the OLU.

16. The apparatus of claim 15 wherein the remaining portion of the information conveyed by the sniffing filter comprises addressing information relating to the OLU and DLU, and a TP level associated the mode name.

17. A computer readable medium containing executable program instructions for acquiring information used by a switching node of a network to implement transmission priority (TP) routing of data traffic between end devices of the network, the executable program instructions comprising program instructions for:
  establishing a bounded time interval during which the switching node examines the data traffic over the network;
  triggering monitoring the data traffic during the bounded time interval for a defined data packet in response to a predetermined triggering event; and
  capturing a portion of the information from the defined data packet at the switching node during the bounded time interval;
  wherein the predetermined triggering event is a request issued by one node of the network to a second node of the network for the second node to compute a route through the network between the one node and a third node of the network.

18. The medium of claim 17 further comprising program instructions for communicating occurrence of the predetermined event from a hybrid node of the network to the switching node.

19. The medium of claim 18 wherein the defined data packet is a BIND message used to convey an optimum route for a logical unit to logical unit (LU-LU) session between the end nodes and wherein the program instructions for communicating comprises program instructions for:
  generating a sniffing filter at the hybrid node, the sniffing filter specifying an opcode instructing a search for the BIND message and a mode name associated with a particular TP level; and
  transferring the sniffing filter to the switching node.

20. The medium of claim 19 further comprising program instructions for providing the remaining portion of the information from the hybrid node to the switching node using the sniffing filter.

21. A switching node for efficiently acquiring information used to implement transmission priority (TP) routing of data traffic over a connection network between end nodes of the network, the switching node comprising:
  means for establishing a bounded time interval for examining the data traffic over the network;
  means for monitoring the data traffic during the bounded time interval for a defined data packet in response to a predetermined event; and
  means for capturing a portion of the information from the defined data packet during the bounded time interval, the captured portion of information used to implement TP routing wherein the predetermined event is a request issued by one node of the network to a second node of the network for the second node to compute a route through the network between the one node and a third node of the network.

22. A method implemented by a switching node, the method being for efficiently acquiring information used to implement transmission priority (TP) routing of data traffic over a connection network between end nodes of the network, the method comprising:
  establishing a bounded time interval for examining the data traffic over the network;
  triggering monitoring the data traffic during the bounded time interval for a defined data packet in response to a predetermined triggering event; and
  capturing a portion of the information from the defined data packet during the bounded time interval, the captured portion of information used to implement TP routing;
  wherein the predetermined triggering event is a request issued by one node of the network to a second node of the network for the second node to compute a route through the network between the one node and a third node of the network.

23. A computer readable medium containing executable program instructions for being executed by a switching node for causing the node to efficiently acquire information used to implement transmission priority (TP) routing of data traffic over a connection network between end nodes of the network, the program instructions comprising instructions for:
  establishing a bounded time interval for examining the data traffic over the network:
  triggering monitoring the data traffic during the bounded time interval for a defined data packet in response to a predetermined triggering event; and
  capturing a portion of the information from the defined data packet during the bounded time interval, the captured portion of information used to implement TP routing;
  wherein the predetermined triggering event is a request issued by one node of the network to a second node of the network for the second node to compute a route through the network between the one node and a third node of the network.

* * * * *